United States Patent
Kang et al.

(10) Patent No.: US 9,042,475 B2
(45) Date of Patent: May 26, 2015

(54) SIGNAL TRANSMITTING METHOD AND DEVICE IN A MULTI-NODE SYSTEM

(75) Inventors: Ji Won Kang, Anyang-si (KR); Bin Chul Ihm, Anyang-si (KR); Su Nam Kim, Anyang-si (KR); Jin Young Chun, Anyang-si (KR); Sung Ho Park, Anyang-si (KR); Ki Tae Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/006,502

(22) PCT Filed: Dec. 16, 2011

(86) PCT No.: PCT/KR2011/009721
§ 371 (c)(1),
(2), (4) Date: Sep. 20, 2013

(87) PCT Pub. No.: WO2012/128446
PCT Pub. Date: Sep. 27, 2012

(65) Prior Publication Data
US 2014/0010321 A1 Jan. 9, 2014

Related U.S. Application Data

(60) Provisional application No. 61/454,990, filed on Mar. 21, 2011.

(51) Int. Cl.
*H04B 7/02* (2006.01)
*H04B 7/04* (2006.01)
(Continued)

(52) U.S. Cl.
CPC ............ *H04B 7/0456* (2013.01); *H04B 7/0634* (2013.01); *H04B 7/0639* (2013.01); *H04B 7/024* (2013.01); *H04L 1/0025* (2013.01); *H04L 1/06* (2013.01)

(58) Field of Classification Search
CPC .. H04B 7/0634; H04B 7/0639; H04B 7/0456; H04B 7/024; H04L 1/0025
USPC ................... 375/267, 259, 268, 269; 370/329
See application file for complete search history.

(56) References Cited

U.S. PATENT DOCUMENTS

| | | | |
|---|---|---|---|
| 2008/0013610 A1* | 1/2008 | Varadarajan et al. | 375/221 |
| 2008/0132281 A1* | 6/2008 | Kim et al. | 455/562.1 |

(Continued)

OTHER PUBLICATIONS

Sawahashi et al., "Coordinated Multipoint Transmission/Reception Techniques for LTE-Advanced", IEEE Wireless Communications, Jun. 2010, pp. 26-34.

(Continued)

*Primary Examiner* — Shuwang Liu
*Assistant Examiner* — Helene Tayong
(74) *Attorney, Agent, or Firm* — Birch, Stewart, Kolasch & Birch, LLP

(57) ABSTRACT

Provided is a signal transmitting method of a terminal in a multi-node system including and configured to control a plurality of nodes and a base station connected to each of the plurality of nodes. The method includes: estimating a channel of at least one node by receiving a reference signal from at least one node among the plurality of nodes; selecting a preferred rank and a precoding matrix index by applying at least one precoding matrix to the estimated channel; selecting one of a plurality of codeword-layer mappings (CLMs) by applying a precoding matrix indicated by the rank and the precoding matrix index; and transmitting the selected rank, the selected precoding matrix index, and a CLM indicator to the base station.

17 Claims, 9 Drawing Sheets

(51) Int. Cl.
  *H04B 7/06* (2006.01)
  *H04L 1/00* (2006.01)
  *H04L 1/06* (2006.01)

(56) References Cited

U.S. PATENT DOCUMENTS

| 2008/0188190 | A1* | 8/2008 | Prasad et al. ............... 455/114.3 |
| 2010/0195594 | A1* | 8/2010 | Seo et al. ...................... 370/329 |
| 2010/0279621 | A1 | 11/2010 | Brown et al. |
| 2010/0317382 | A1* | 12/2010 | Lee et al. ...................... 455/501 |
| 2012/0140723 | A1* | 6/2012 | Taoka et al. ................... 370/329 |
| 2014/0161067 | A1* | 6/2014 | Lee et al. ...................... 370/329 |

OTHER PUBLICATIONS

Virtej et al., "System Performance of Single-User MIMO in LTE Downlink", IEEE 19th International Symposium on Personal, Indoor and Mobile Radio Communications, Sep. 18, 2008, pp. 1-5.

* cited by examiner

FIG. 7

K×K matrix P

| r(p(0)) | r(p(1)) | ... | r(p(M-1)) | |
|---|---|---|---|---|
| | | ... | | } r(0) |
| | | ... | | } r(1) |
| | | ⋱ | | ⋮ |
| | | ... | | } r(M-1) |

FIG. 8

$$P = \begin{bmatrix} \overbrace{\begin{matrix} 0 & 0 \end{matrix}}^{\substack{\text{column}\\\text{block \#0}}} & \overbrace{\begin{matrix} 0 & 0 \end{matrix}}^{\substack{\text{column}\\\text{block \#1}}} & \overbrace{\begin{matrix} 1 & 0 & 0 & 0 \end{matrix}}^{\text{column block \#2}} \\ \end{bmatrix}$$

| | column block #0 | column block #1 | column block #2 | | |
|---|---|---|---|---|---|
| | 0  0 | 0  0 | 1  0  0  0 | } row block #0 | |
| | 0  0 | 0  0 | 0  1  0  0 | | |
| | 0  0 | 0  0 | 0  0  1  0 | | |
| | 0  0 | 0  0 | 0  0  0  1 | | |
| | 1  0 | 0  0 | 0  0  0  0 | } row block #1 | |
| | 0  1 | 0  0 | 0  0  0  0 | } row block #2 | |

SIGNAL TRANSMITTING METHOD AND DEVICE IN A MULTI-NODE SYSTEM

CROSS REFERENCE TO RELATED APPLICATIONS

This non-provisional application is a National Stage entry under U.S.C. §371 of International Application No. PCT/KR2011/009721 filed on Dec. 16, 2011, which claims the benefit of U.S. Provisional Application No. 61/454,990 filed on Mar. 21, 2011. The entire contents of all of the above applications are hereby incorporated by reference.

BACKGROUND OF THE INVENTION

1. Field of the Invention

The present invention relates to wireless communications, and more particularly, to a method and apparatus for transmitting signals in a multi-node system.

2. Related Art

A data transfer amount of a wireless network has been rapidly increased in recent years. It is because various devices, e.g., a smart phone, a tablet personal computer (PC), or the like, that require machine-to-machine (M2M) communication and a high data transfer amount have been introduced and propagated. To satisfy the required high data transfer amount, a carrier aggregation (CA) technique, a recognition radio (CR) technique, or the like for effectively using more frequency bands, and a multiple antenna technique, a multiple base station cooperation technique, or the like for increasing data capacity within a limited frequency have recently drawn attention.

In addition, the wireless network has been evolved in a direction of increasing density of a node capable of accessing to an area around a user. Herein, the node implies an antenna (or antenna group) which is separated from a distributed antenna system (DAS) by a certain distance or farther. However, the node is not limited to this definition, and thus can also be used in a broader sense. That is, the node may be a macro eNB, a pico-cell eNB (PeNB), a home eNB (HeNB), a remote radio head (RRH), a remote radio unit (RRU), a relay, a distributed antenna (group), etc. A wireless communication system having nodes with higher density can provide higher system performance through cooperation between the nodes. That is, better system performance can be achieved when one base station controller manages transmission and reception of respective nodes and thus the nodes operate as if they are antennas or an antenna group for one cell, in comparison with a case where the respective nodes operate without cooperating with each other. Hereinafter, a wireless communication system including a plurality of nodes and an eNB for controlling the plurality of nodes is referred to as a multi-node system.

The plurality of nodes in the multi-node system can include at least one or more transmit antennas, and the eNB can transmit a signal by using two or more transmit antennas of the at least one or more nodes. That is, the multi-node system can operate based on multi input multi output (MIMO).

When the conventional wireless communication system operates based on MIMO, the eNB maps a codeword to a layer, and maps the layer to an antenna port and thereafter transmits it through a transmit antenna. In the conventional method, a fixed codeword-to-layer mapping (CLM) is used when the number of layers and the number of codewords are determined. When the conventional method is equally applied to the multi-node system, there is a problem in that flexibility of signal transmission deteriorates due to the fixed CLM.

Accordingly, there is a need for a new CLM method and transmission apparatus applicable to a multi-node system.

SUMMARY OF THE INVENTION

The present invention provides a method and apparatus for transmitting signals in a multi-node system.

According to an aspect of the present invention, a signal transmission method of a user equipment (UE) in a multi-node system including a plurality of nodes and a base station (BS) coupled to each of the plurality of nodes and capable of controlling each node is provided. The method includes: estimating a channel for at least one node by receiving a reference signal from the at least one node among the plurality of nodes; selecting a preferred rank and precoding matrix index by applying at least one precoding matrix to the estimated channel; selecting one of a plurality of codeword-to-layer mappings (CLMs) by applying a precoding matrix indicated by the rank and the precoding matrix index; and transmitting the selected rank, the selected precoding matrix index, and a CLM indicator to the BS, wherein the plurality of CLMs are determined to be plural in number according to the total number of layers of the at least one node and the number of codewords transmitted in the at least one node, and the CLM indicator indicates the CLM selected from the plurality of CLMs.

In the aforementioned aspect of the present invention, the method further includes: receiving from the BS a plurality of codewords mapped to a plurality of layers; and measuring quality for each of the plurality of layers, wherein the CLM indicator indicates a CLM in which layers having a smallest difference in quality among the plurality of layers are mapped to the same codeword.

In addition, the plurality of codewords may be two codewords.

In addition, the maximum number of the plurality of layers may be 8.

In addition, quality of each of the plurality of layers may be determined based on an average magnitude or average power of signals received through the respective layers.

In addition, the layers having the smallest difference in quality among the plurality of layers may be layers which minimize a dispersion of quality values of layers mapped to one codeword or layers which minimize a value obtained by subtracting a minimum quality value from a maximum quality value of each layer.

In addition, the preferred rank and precoding matrix index may be selected from a per-node rank and per-node precoding matrix index for each of the at least one node.

In addition, the method further includes transmitting layer permutation information to the BS, wherein the layer permutation information is information indicating a layer permutation performed after a CLM indicated by the CLM indicator.

In addition, the layer permutation may be a permutation performed after grouping layers output by using a CLM indicated by the CLM indicator.

In addition, grouping of the output layers may be determined according to a rank value of each node included in the at least one node.

In addition, the layer permutation may be for mapping layers mapped to the same node to one codeword among layers output by using the CLM indicated by the CLM indicator.

In addition, the node permutation information may be transmitted to the BS with a period longer than the selected rank and the selected precoding matrix index.

According to another aspect of the present invention, a signal transmission method of a UE in a multi-node system including a plurality of nodes and a BS coupled to each of the plurality of nodes and capable of controlling each node is provided. The method includes: estimating a channel for at least one node by receiving a reference signal from the at least one node among the plurality of nodes; selecting a preferred per-node rank and per-node precoding matrix index for each of the at least one node by applying at least one precoding matrix to the estimated channel; selecting a layer permutation by applying a precoding matrix indicated by the per-node rank and the per-node precoding matrix index; and transmitting to the BS the per-node precoding matrix, the layer permutation, and a layer permutation indicator indicating the per-node rank.

In the aforementioned aspect of the present invention, the layer permutation may be a permutation performed after grouping layers input to a precoding matrix indicated by the precoding matrix index according to a rank value of the at least one node.

According to another aspect of the present invention, a signal transmission method in a BS coupled to each of the plurality of nodes and capable of controlling each node is provided. The method includes: transmitting a CLM indicator; mapping a plurality of codewords to at least one layer; mapping the mapped at least one layer to at least one antenna port; and transmitting a signal mapped to the antenna port through at least one node among the plurality of nodes, wherein the CLM indicator indicates any one or more of CLMs determined to be plural in number according to the total number of layers of the at least one node and the number of codewords transmitted in the at least one node, and wherein a CLM used in the mapping of the plurality of codewords to at least one layer is limited by the CLM indicator.

In the aforementioned aspect of the present invention, the CLM indicator may indicate two or more of the plurality of CLMs, and may further include transmitting information indicating a preferred CLM among two or more CLMs included in the CLM indicator to the BS by a UE which receives the CLM indicator.

According to another aspect of the present invention, there is provided a signal transmission apparatus including: a layer mapper for mapping a plurality of codewords to at least one layer; a layer permuter for receiving a plurality of layers input from the layer mapper, for grouping layers in the same number as a rank value of at least one node, and for permuting the grouped layers; and a precoder for receiving a plurality of layers input from the layer permuter and for mapping the layers to an antenna port, wherein the layer mapper selects one of CLMs determined to be plural in number according to the total number of layers of the at least one node and the number of codewords transmitted in the at least one node, and wherein the layer permuter groups a plurality of layers input from the layer permuter into layers in the same number as the rank value of the at least one node and thereafter permutes the grouped layers.

A codeword-to-layer mapping method and apparatus capable of optimizing performance in a multi-node system are provided. In addition, since an amount of information which is fed back by a user equipment can be decreased by using a node-based layer permutation, a signaling overhead can be decreased and a complexity of the user equipment can be decreased.

BRIEF DESCRIPTION OF THE DRAWINGS

FIG. 7 shows an example of obtaining a layer permutation matrix P for a node-based layer permutation.
FIG. 8 shows an example of obtaining a layer permutation matrix P by applying the method described in FIG. 7 to the example described in FIG. 6.

DESCRIPTION OF EXEMPLARY EMBODIMENTS

Technologies described below are applicable to various radio access schemes such as code division multiple access (CDMA), frequency division multiple access (FDMA), time division multiple access (TDMA), orthogonal frequency division multiple access (OFDMA), single carrier frequency division multiple access (SC-FDMA), etc. The radio access scheme can be implemented with various radio communication standard systems. $3^{rd}$ generation partnership project (3GPP) long term evolution (LTE) is a part of an evolved UMTS (E-UMTS), and uses the OFDMA in a downlink and uses the SC-FDMA in an uplink. LTE-advance (LTE-A) is an evolution of the LTE.

Figure 1:
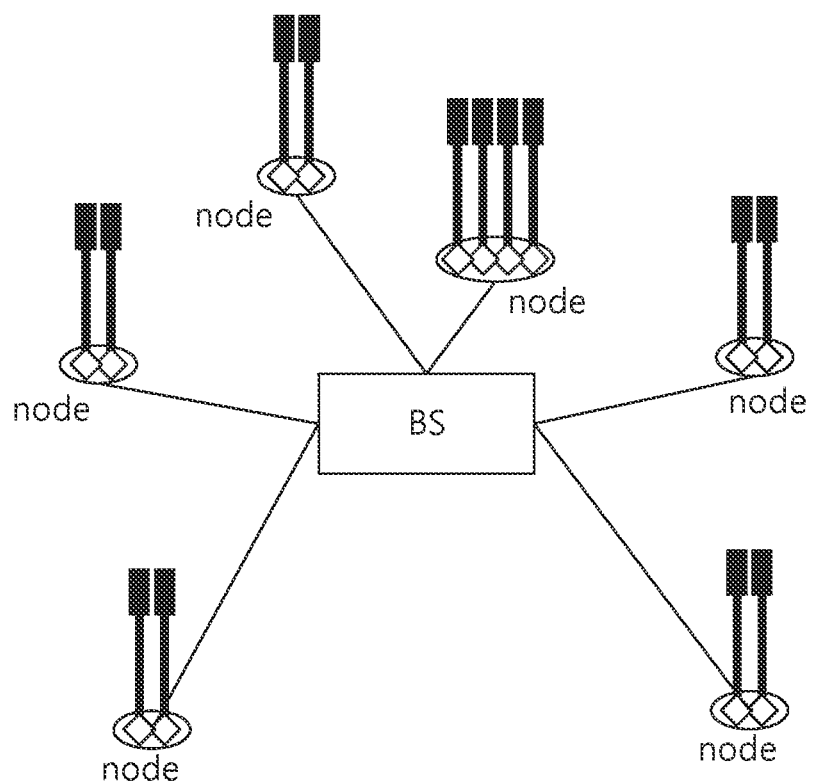
FIG. 1 shows an example of a multi-node system.

FIG. 1 shows an example of a multi-node system.

The multi-node system includes a base station (BS) and a plurality of nodes.

The BS provides a communication service to a specific geographical region. The BS is generally a fixed station that communicates with a user equipment (UE) and may be referred to as another terminology, such as an evolved Node-B (eNB), a base transceiver system (BTS), an advanced base station (ABS), etc.

A distributed antenna is shown in FIG. 1 as an example of a node, and in this sense, the node may be called as an antenna node (AN). However, the node is not limited to the distributed antenna, and thus may be, for example, a macro eNB, a pico-cell eNB (PeNB), a home eNB (HeNB), a remote radio head (RRH), a relay, etc. The node is also called a point. The node may be connected to the BS in a wired or wireless fashion, and may be controlled/managed by the BS.

From the perspective of the UE, the node can be identified or indicated by using a reference signal (RS) or a pilot signal. The RS (or pilot signal, hereinafter, the same is also applied) is a signal known to a transmitting side and a receiving side, and implies a signal used for channel measurement, data demodulation, etc. Examples of the RS include a channel status indication-reference signal (CSI-RS) defined in 3GPP LTE-A and a preamble, midamble, etc., defined in IEEE 802.16m. The RS or a configuration for the RS can be mapped to each node (or a transmit antenna of each node). If the RS configuration and mapping information between nodes are given to the UE or are pre-known to the UE, the UE can identify a node on the basis of a CSI-RS configuration or can be instructed to identify the node, and can obtain channel state information on the node. The RS configuration may include information regarding a configuration index, the number of antenna ports of each node, a resource element (RE) in use, a transmission period, an offset of a transmission time, etc. Therefore, in the present invention, the technique for measuring a signal or generating channel state information with respect to a specific node by the UE may imply measuring of the signal or generating of the channel state information with respect to a specific RS from the perspective of the UE.

Referring back to FIG. 1, the node is connected to the BS in a wired/wireless fashion, and each node may include one antenna or a plurality of antennas (i.e., an antenna group). Antennas belonging to one node may be geographically located within several meters and show the same feature. In the multi-node system, the node serves as an access point (AP) accessible by the UE.

In a case where the node includes the antennas in the multi-node system as described above, it may be called a distributed antenna system (DAS). That is, the DAS is a system in which antennas (i.e., nodes) are deployed in various positions in a geographically distributed manner, and these antennas are managed by the BS. The DAS is different from a conventional centralized antenna system (CAS) in which antennas of the BS are centralized in a cell center.

Herein, if the antennas are deployed in a geographically distributed manner, it may imply that, if one receiver receives the same signal from the plurality of antennas, the antennas are deployed such that a channel state difference between each antenna and the receiver is greater than or equal to a specific value. If the antennas are deployed in a centralized manner, it may imply that the antennas are deployed in a localized manner such that a channel state difference between each antenna and one receiver is less than the specific value. The specific value can be determined variously according to a frequency, service type, etc., used by the antennas.

As described above, each of the plurality of nodes in the multi-node system may include multiple transmit antennas. The BS can transmit a signal to the UE and can receive a signal from the UE through a plurality of transmit antennas of at least one node among the plurality of nodes. That is, the multi-node system can operate based on multiple input multiple output (MIMO).

The MIMO scheme includes spatial diversity in which the same stream is transmitted to multiple layers and spatial multiplexing in which multiple streams are transmitted to multiple layers. When the multiple streams are transmitted to a single user in the spatial multiplexing, it is called single user-MIMO (SU-MIMO) or spatial division multiple access (SDMA). When the multiple streams are transmitted to multiple users in the spatial multiplexing, it is called multi user-MIMO (MU-MIMO). According to whether feedback information reported from each user is used or not, the spatial diversity and the spatial multiplexing can be classified into an open-loop scheme and a closed-loop scheme.

Figure 2:
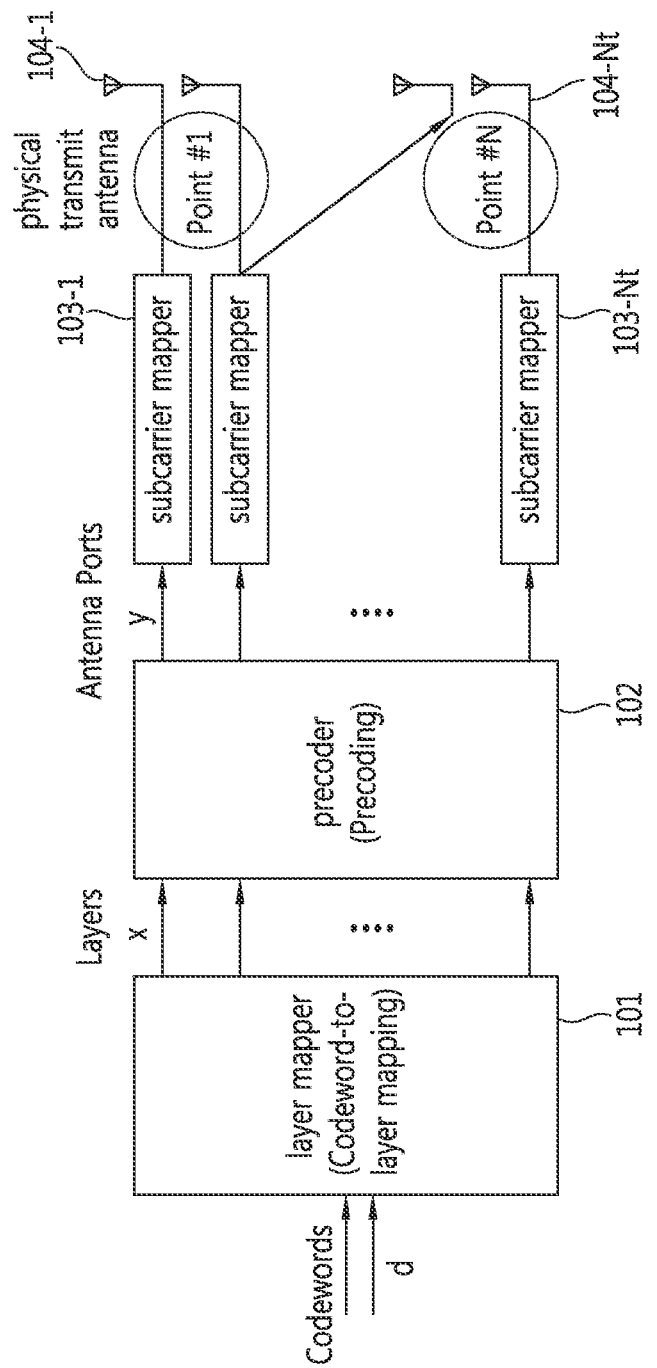
FIG. 2 shows a procedure of processing a physical layer signal in a multi-node system.

FIG. 2 shows a procedure of processing a physical layer signal in a multi-node system.

Referring to FIG. 2, the multi-node system includes a layer mapper 101, a precoder 102, subcarrier mappers 103-1, ..., 103-Nt, and physical transmit antennas 104-1, ..., 104-Nt.

The layer mapper 101 is a codeword-to-layer mapping (CLM) unit. A codeword is generated by encoding information bits according to a predetermined coding scheme, and can be scrambled. Each codeword is modulated according to a modulation scheme, and is mapped to modulation symbols having a complex value. A modulation scheme is not limited to a specific modulation scheme, and may be an m-phase shift keying (m-PSK) or an m-quadrature amplitude modulation (m-QAM). Examples of the m-PSK include binary PSK (BPSK), quadrature PSK (QPSK), and 8-PSK. Examples of the m-QAM include 16-QAM, 64-QAM, and 256-QAM. The codeword mapped to the modulation symbol may be input by the layer mapper 101 and then may be mapped to multiple layers. Herein, the total number of layers is called a rank.

The precoder 102 is a unit for mapping each layer, which is input thereto, to an antenna port. The precoder 102 processes each input layer according to a MIMO scheme based on a plurality of antenna ports, and outputs an antenna port specific symbol.

The subcarrier mappers 103-1, ..., 103-Nt map antenna port specific symbols to resource elements and convert them into transmit signals. The transmit signals are transmitted through the physical transmit antennas 104-1, ..., 104-Nt. The number of transmit signals converted by the subcarrier mapper is not necessarily equal to the number of physical transmit antennas. In the LTE system, a mapping relation between transmit signals converted by the subcarrier mapper and the physical transmit antennas are transparent to a UE.

In the 3GPP LTE, modulation symbols $d^{(q)}(0), \ldots, d^{(q)}(M^{(q)}_{symb}-1)$ are mapped to a layer $x(i)=[x^{(0)}(i) \ldots x^{(\upsilon-1)}(i)]^T$ $(i=0, 1, \ldots, M^{layer}_{symb}-1)$. Herein, $M^{(q)}_{symb}$ denotes the number of modulation symbols for a codeword q, $\upsilon$ denotes the number of layers, and $M^{layer}_{symb}$ denotes the number of modulation symbols per layer. The conventional codeword-to-layer mapping for spatial multiplexing is as shown in Table 1 below.

TABLE 1

| Number of layers | Number of codewords | Codeword-to-layer mapping $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 1 | $x^{(0)}(i) = d^{(0)}(2i)$ $x^{(1)}(i) = d^{(0)}(2i + 1)$ | $M^{layer}_{symb} = M^{(0)}_{symb}/2$ |
| 2 | 2 | $x^{(0)}(i) = d^{(0)}(i)$ $x^{(1)}(i) = d^{(1)}(i)$ | $M^{layer}_{symb} = M^{(0)}_{symb} = M^{(1)}_{symb}$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M^{layer}_{symb} = M^{(0)}_{symb}/3$ |
| 3 | 2 | $x^{(0)}(i) = d^{(0)}(i)$ $x^{(1)}(i) = d^{(1)}(2i)$ $x^{(2)}(i) = d^{(1)}(2i + 1)$ | $M^{layer}_{symb} = M^{(0)}_{symb} = M^{(1)}_{symb}/2$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M^{layer}_{symb} = M^{(0)}_{symb}/4$ |
| 4 | 2 | $x^{(0)}(i) = d^{(0)}(2i)$ $x^{(1)}(i) = d^{(0)}(2i + 1)$ $x^{(2)}(i) = d^{(1)}(2i)$ $x^{(3)}(i) = d^{(1)}(2i + 1)$ | $M^{layer}_{symb} = M^{(0)}_{symb}/2 = M^{(1)}_{symb}/2$ |
| 5 | 2 | $x^{(0)}(i) = d^{(0)}(2i)$ $x^{(1)}(i) = d^{(0)}(2i + 1)$ $x^{(2)}(i) = d^{(1)}(3i)$ $x^{(3)}(i) = d^{(1)}(3i + 1)$ $x^{(4)}(i) = d^{(1)}(3i + 2)$ | $M^{layer}_{symb} = M^{(0)}_{symb}/2 = M^{(1)}_{symb}/3$ |
| 6 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(3i)$ $x^{(4)}(i) = d^{(1)}(3i + 1)$ $x^{(5)}(i) = d^{(1)}(3i + 2)$ | $M^{layer}_{symb} = M^{(0)}_{symb}/3 = M^{(1)}_{symb}/3$ |
| 7 | 2 | $x^{(0)}(i) = d^{(0)}(3i)$ $x^{(1)}(i) = d^{(0)}(3i + 1)$ $x^{(2)}(i) = d^{(0)}(3i + 2)$ $x^{(3)}(i) = d^{(1)}(4i)$ $x^{(4)}(i) = d^{(1)}(4i + 1)$ $x^{(5)}(i) = d^{(1)}(4i + 2)$ $x^{(6)}(i) = d^{(1)}(4i + 3)$ | $M^{layer}_{symb} = M^{(0)}_{symb}/3 = M^{(1)}_{symb}/4$ |

TABLE 1-continued

| Number of layers | Number of codewords | Codeword-to-layer mapping $i = 0, 1, \ldots, M_{symb}^{layer} - 1$ | |
|---|---|---|---|
| 8 | 2 | $x^{(0)}(i) = d^{(0)}(4i)$ | $M_{symb}^{layer} = M_{symb}^{(0)}/4 =$ |
| | | $x^{(1)}(i) = d^{(0)}(4i + 1)$ | $M_{symb}^{(1)}/4$ |
| | | $x^{(2)}(i) = d^{(0)}(4i + 2)$ | |
| | | $x^{(3)}(i) = d^{(0)}(4i + 3)$ | |
| | | $x^{(4)}(i) = d^{(1)}(4i)$ | |
| | | $x^{(5)}(i) = d^{(1)}(4i + 1)$ | |
| | | $x^{(6)}(i) = d^{(1)}(4i + 2)$ | |
| | | $x^{(7)}(i) = d^{(1)}(4i + 3)$ | |

As shown in Table 1 above, in the conventional codeword-to-layer mapping, fixed codeword-to-layer mapping is applied when the number of codewords and the number of layers are determined. For example, if the number of codewords is 1 and the number of layers is 8, a codeword #0 (i.e., $d^{(0)}$) is mapped to layers #0 to #3 (i.e., $x^{(0)}$ to $x^{(3)}$), and a codeword #1 (i.e., $d^{(1)}$) is mapped to layers #4 to #7 (i.e., $x^{(4)}$ to $x^{(7)}$). When the conventional codeword-to-layer mapping is directly applied to the multi-node system, there is a case where performance cannot be optimized.

A condition for optimizing performance in the multi-node system is as follows. If two or more codewords are transmitted, system performance is optimized when only one codeword is transmitted in one node. That is, a condition for performance optimization in the multi-node system is that only one codeword is transmitted instead of transmitting two or more codewords in one node. In the multi-node system, channels of respective nodes are uncorrelated, and fading or a path loss also differs from one node to another. Therefore, this is because, in case of mapping multiple codewords using different modulation and coding schemes (MCSs), it is more effective to map only one codeword to each node rather than mapping multiple codewords to one node.

In order to satisfy the above condition, it is assumed in the present invention that antenna port selective precoding is added to the procedure of processing the physical layer signal of the multi-node system. Herein, the antenna port selective precoding implies precoding in which only some layer groups are mapped to some antenna port groups. If the precoding is performed through a precoding matrix as in closed-loop spatial multiplexing, the precoding matrix has a block diagonal matrix shape. When the antenna port selective precoding is applied, some layers corresponding to one codeword are transmitted only through specific antenna ports, and the antenna ports are transmitted only in some nodes (or node groups). Therefore, a codeword can be identified on a node basis as in the above condition and a different MCS is applied thereto to optimize system performance.

Hereinafter, for convenience of explanation, it is assumed in the present invention that up to 2 codewords and up to 8 layers can be transmitted to the UE. However, the present invention is not limited thereto, and thus can also apply when the number of codewords and the number of layers are different thereto.

Figure 3:
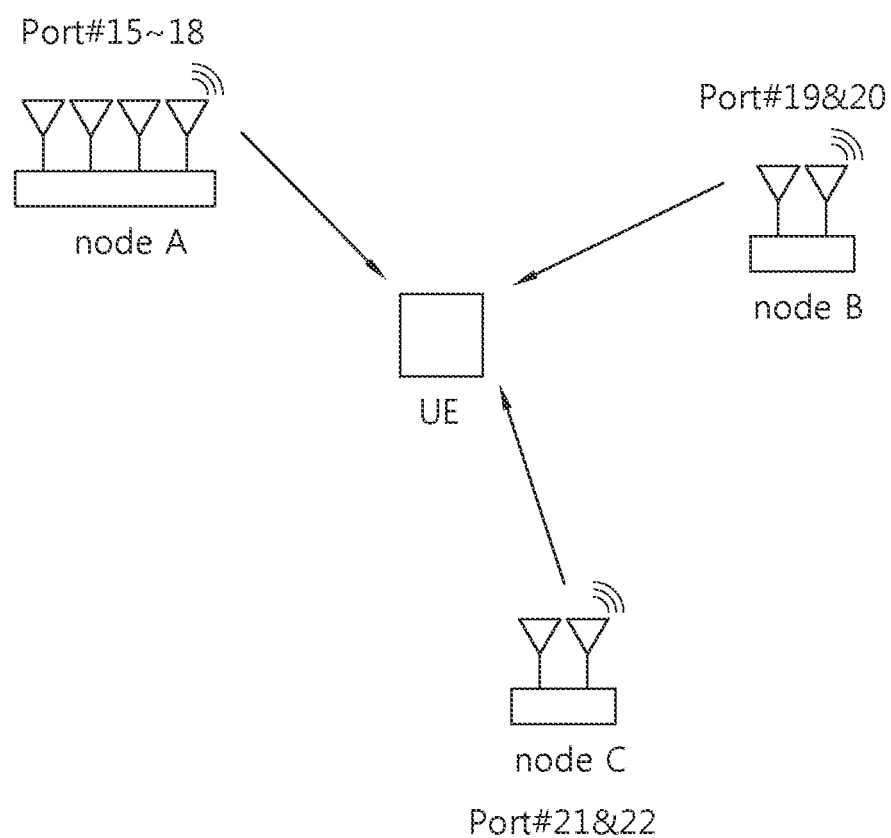
FIG. 3 shows an example of a multi-node system under the assumption that a signal is transmitted by using the conventional codeword-to-layer mapping.

FIG. 3 shows an example of a multi-node system. It is assumed in FIG. 3 that a signal is transmitted by using the conventional codeword-to-layer mapping.

Referring to FIG. 3, three nodes can exist around a UE. It is assumed that the three nodes are allocated to the UE to transmit 8 CSI-RSs to the UE. That is, a node A transmits 4 CSI-RSs by using antenna ports #15 to #18, a node B transmits 2 CSI-RSs by using antenna ports #19 to #20, and a node C transmits 2 CRI-RSs by using antenna ports #21 to #22.

In this case, the UE may have to feed back channel state information, i.e., a channel quality indicator (CQI), a precoding matrix index (PMI), a rank indicator (RI), etc., at the request of a BS. For this, by applying various 8×K-sized precoding matrices included in a codebook, the UE acquires an optimal K value and a corresponding PMI. Herein, the optimal K value is a full rank (RI) value.

It is assumed that the optimal K value acquired by the UE is 6, that is, the rank value is 6. In addition, it is assumed that, according to the antenna port selective precoding, among 6 layers, layers #0 to #3 are mapped to a node A, a layer #4 is mapped to a node B, and a layer #5 is mapped to a node C.

In this case, according to a CLM in which the total number of layers is 6 and the number of codewords is 2 in Table 1 above, a first codeword is mapped to the layers #0 to #2, and a second codeword is mapped to the layers #3 to #5. However, since the layers #0 to #3 are mapped to the node A according to the antenna port selective precoding as described above, two codewords must be transmitted in the node A in such a manner that the first codeword is transmitted through the layers #0 to #2 and the second codeword is transmitted through the layer #3. This does not satisfy the aforementioned condition for optimizing performance. Therefore, the conventional codeword-to-layer mapping method is not enough to optimize the performance of the multi-node system.

Table 2 below shows codeword-to-layer mapping according to an embodiment of the present invention. Table 2 is an example extended from Table 1 with respect to a case where the number of layers is greater than or equal to 4, and two codewords are used. Specifically, Table 2 is extended from Table 1 under the assumption that the number of layers mapped to a first layer (i.e., a codedword 0) is less than or equal to the number of layers mapped to a second codeword (i.e., a codeword 1), and a combination based on a layer order is ignored. In Table 2, the number of layers and the number of codewords respectively imply the total number of layers and the number of codewords received by the UE.

TABLE 2

| Number of layers | Number of codewords | CLM indicator | Codeword-to-layer mapping $i = 0, 1, \ldots, M_{symb}^{layer} - 1$ | |
|---|---|---|---|---|
| 4 | 2 | 0 | $x^{(0)}(i) = d^{(0)}(2i)$ | $M_{symb}^{layer} = M_{symb}^{(0)}/2 =$ |
| | | | $x^{(1)}(i) = d^{(0)}(2i + 1)$ | $M_{symb}^{(1)}/2$ |
| | | | $x^{(2)}(i) = d^{(1)}(2i)$ | |
| | | | $x^{(3)}(i) = d^{(1)}(2i + 1)$ | |
| | | 1 | $x^{(0)}(i) = d^{(0)}(i)$ | $M_{symb}^{layer} = M_{symb}^{(0)} =$ |
| | | | $x^{(1)}(i) = d^{(1)}(3i)$ | $M_{symb}^{(1)}/3$ |
| | | | $x^{(2)}(i) = d^{(1)}(3i + 1)$ | |
| | | | $x^{(3)}(i) = d^{(1)}(3i + 2)$ | |
| 5 | 2 | 0 | $x^{(0)}(i) = d^{(0)}(2i)$ | $M_{symb}^{layer} = M_{symb}^{(0)}/2 =$ |
| | | | $x^{(1)}(i) = d^{(0)}(2i + 1)$ | $M_{symb}^{(1)}/3$ |
| | | | $x^{(2)}(i) = d^{(1)}(3i)$ | |
| | | | $x^{(3)}(i) = d^{(1)}(3i + 1)$ | |
| | | | $x^{(4)}(i) = d^{(1)}(3i + 2)$ | |
| | | 1 | $x^{(0)}(i) = d^{(0)}(i)$ | $M_{symb}^{layer} = M_{symb}^{(0)} =$ |
| | | | $x^{(1)}(i) = d^{(1)}(4i)$ | $M_{symb}^{(1)}/4$ |
| | | | $x^{(2)}(i) = d^{(1)}(4i + 1)$ | |
| | | | $x^{(3)}(i) = d^{(1)}(4i + 2)$ | |
| | | | $x^{(4)}(i) = d^{(1)}(4i + 3)$ | |
| 6 | 2 | 0 | $x^{(0)}(i) = d^{(0)}(3i)$ | $M_{symb}^{layer} = M_{symb}^{(0)}/3 =$ |
| | | | $x^{(1)}(i) = d^{(0)}(3i + 1)$ | $M_{symb}^{(1)}/3$ |
| | | | $x^{(2)}(i) = d^{(0)}(3i + 2)$ | |
| | | | $x^{(3)}(i) = d^{(1)}(3i)$ | |
| | | | $x^{(4)}(i) = d^{(1)}(3i + 1)$ | |
| | | | $x^{(5)}(i) = d^{(1)}(3i + 2)$ | |
| | | 1 | $x^{(0)}(i) = d^{(0)}(2i)$ | $M_{symb}^{layer} = M_{symb}^{(0)}/2 =$ |
| | | | $x^{(1)}(i) = d^{(0)}(2i + 1)$ | $M_{symb}^{(1)}/4$ |
| | | | $x^{(2)}(i) = d^{(1)}(4i)$ | |
| | | | $x^{(3)}(i) = d^{(1)}(4i + 1)$ | |

TABLE 2-continued

| Number of layers | Number of code-words | CLM indi-cator | Codeword-to-layer mapping $i = 0, 1, \ldots, M_{symb}^{layer} - 1$ | |
|---|---|---|---|---|
| | | | $x^{(4)}(i) = d^{(1)}(4i+2)$ | |
| | | | $x^{(5)}(i) = d^{(1)}(4i+3)$ | |
| | | 2 | $x^{(0)}(i) = d^{(0)}(i)$ | $M_{symb}^{layer} = M_{symb}^{(0)} = M_{symb}^{(1)}/5$ |
| | | | $x^{(1)}(i) = d^{(1)}(5i)$ | |
| | | | $x^{(2)}(i) = d^{(1)}(5i+1)$ | |
| | | | $x^{(3)}(i) = d^{(1)}(5i+2)$ | |
| | | | $x^{(4)}(i) = d^{(1)}(5i+3)$ | |
| | | | $x^{(5)}(i) = d^{(1)}(5i+4)$ | |
| 7 | 2 | 0 | $x^{(0)}(i) = d^{(0)}(3i)$ | $M_{symb}^{layer} = M_{symb}^{(0)}/3 = M_{symb}^{(1)}/4$ |
| | | | $x^{(1)}(i) = d^{(0)}(3i+1)$ | |
| | | | $x^{(2)}(i) = d^{(0)}(3i+2)$ | |
| | | | $x^{(3)}(i) = d^{(1)}(4i)$ | |
| | | | $x^{(4)}(i) = d^{(1)}(4i+1)$ | |
| | | | $x^{(5)}(i) = d^{(1)}(4i+2)$ | |
| | | | $x^{(6)}(i) = d^{(1)}(4i+3)$ | |
| | | 1 | $x^{(0)}(i) = d^{(0)}(2i)$ | $M_{symb}^{layer} = M_{symb}^{(0)}/2 = M_{symb}^{(1)}/5$ |
| | | | $x^{(1)}(i) = d^{(0)}(2i+1)$ | |
| | | | $x^{(2)}(i) = d^{(1)}(5i)$ | |
| | | | $x^{(3)}(i) = d^{(1)}(5i+1)$ | |
| | | | $x^{(4)}(i) = d^{(1)}(5i+2)$ | |
| | | | $x^{(5)}(i) = d^{(1)}(5i+3)$ | |
| | | | $x^{(6)}(i) = d^{(1)}(5i+4)$ | |
| | | 2 | $x^{(0)}(i) = d^{(0)}(i)$ | $M_{symb}^{layer} = M_{symb}^{(0)} = M_{symb}^{(1)}/6$ |
| | | | $x^{(1)}(i) = d^{(1)}(6i)$ | |
| | | | $x^{(2)}(i) = d^{(1)}(6i+1)$ | |
| | | | $x^{(3)}(i) = d^{(1)}(6i+2)$ | |
| | | | $x^{(4)}(i) = d^{(1)}(6i+3)$ | |
| | | | $x^{(5)}(i) = d^{(1)}(6i+4)$ | |
| | | | $x^{(6)}(i) = d^{(1)}(6i+5)$ | |
| 8 | 2 | 0 | $x^{(0)}(i) = d^{(0)}(4i)$ | $M_{symb}^{layer} = M_{symb}^{(0)}/4 = M_{symb}^{(1)}/4$ |
| | | | $x^{(1)}(i) = d^{(0)}(4i+1)$ | |
| | | | $x^{(2)}(i) = d^{(0)}(4i+2)$ | |
| | | | $x^{(3)}(i) = d^{(0)}(4i+3)$ | |
| | | | $x^{(4)}(i) = d^{(1)}(4i)$ | |
| | | | $x^{(5)}(i) = d^{(1)}(4i+1)$ | |
| | | | $x^{(6)}(i) = d^{(1)}(4i+2)$ | |
| | | | $x^{(7)}(i) = d^{(1)}(4i+3)$ | |
| | | 1 | $x^{(0)}(i) = d^{(0)}(3i)$ | $M_{symb}^{layer} = M_{symb}^{(0)}/3 = M_{symb}^{(1)}/5$ |
| | | | $x^{(1)}(i) = d^{(0)}(3i+1)$ | |
| | | | $x^{(2)}(i) = d^{(0)}(3i+2)$ | |
| | | | $x^{(3)}(i) = d^{(1)}(5i)$ | |
| | | | $x^{(4)}(i) = d^{(1)}(5i+1)$ | |
| | | | $x^{(5)}(i) = d^{(1)}(5i+2)$ | |
| | | | $x^{(6)}(i) = d^{(1)}(5i+3)$ | |
| | | | $x^{(7)}(i) = d^{(1)}(5i+4)$ | |
| | | 2 | $x^{(0)}(i) = d^{(0)}(2i)$ | $M_{symb}^{layer} = M_{symb}^{(0)}/2 = M_{symb}^{(1)}/6$ |
| | | | $x^{(1)}(i) = d^{(0)}(2i+1)$ | |
| | | | $x^{(2)}(i) = d^{(1)}(6i)$ | |
| | | | $x^{(3)}(i) = d^{(1)}(6i+1)$ | |
| | | | $x^{(4)}(i) = d^{(1)}(6i+2)$ | |
| | | | $x^{(5)}(i) = d^{(1)}(6i+3)$ | |
| | | | $x^{(6)}(i) = d^{(1)}(6i+4)$ | |
| | | | $x^{(7)}(i) = d^{(1)}(6i+5)$ | |
| | | 3 | $x^{(0)}(i) = d^{(0)}(i)$ | $M_{symb}^{layer} = M_{symb}^{(0)} = M_{symb}^{(1)}/7$ |
| | | | $x^{(1)}(i) = d^{(1)}(7i)$ | |
| | | | $x^{(2)}(i) = d^{(1)}(7i+1)$ | |
| | | | $x^{(3)}(i) = d^{(1)}(7i+2)$ | |
| | | | $x^{(4)}(i) = d^{(1)}(7i+3)$ | |
| | | | $x^{(5)}(i) = d^{(1)}(7i+4)$ | |
| | | | $x^{(6)}(i) = d^{(1)}(7i+5)$ | |
| | | | $x^{(7)}(i) = d^{(1)}(7i+6)$ | |

As shown in Table 2, available other CLMs are added in addition to the codeword-to-layer mapping defined in Table 1 described above. For example, if the number of layers is 4 and the number of codewords is 2, only one codeword-to-layer mapping (CLM) exists in Table 1, whereas two CLMs exist in Table 2. In addition, a CLM indicator is added to Table 2. The CLM indicator can indicate which CLM will be applied in a situation where the number of layers and the number of codewords are determined. The CLM indicator may be transmitted to a BS by being included in channel state information fed back by the UE.

Figure 4:
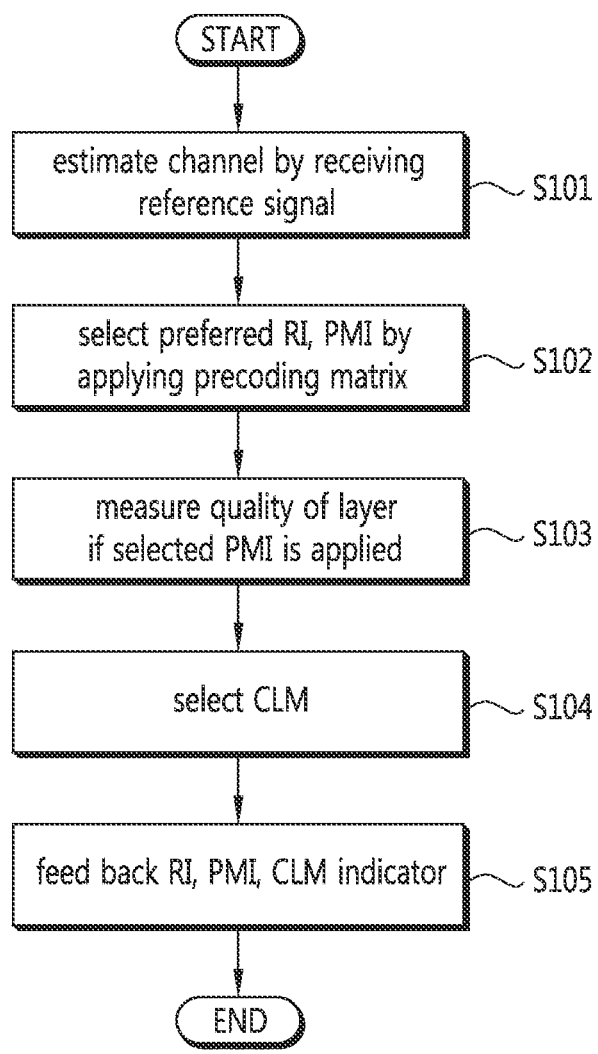
FIG. 4 shows a channel state information feedback method of a user equipment according to an embodiment of the present invention.

FIG. 4 shows a channel state information feedback method of a UE according to an embodiment of the present invention.

Referring to FIG. 4, a UE receives a reference signal from a BS to estimate a channel (step S101). The reference signal may be CSI-RS, CRS, etc. The CRS-RS and the CRS are reference signals transmitted without applying additional precoding for the purpose of channel estimation. The CRS can be transmitted through antenna ports #0 to #3, and the CSI-RS can be transmitted through antenna ports #15 to #22. A configuration of the CSI-RS and the CRS is determined in a cell specific manner, and thus the UE can receive the reference signal at a fixed resource element location always when a serving cell is determined. The UE receives the reference signal to estimate the channel with respect to a given band (e.g., a UE selective subband, a subband configured by a higher layer, a system whole band, etc.).

The UE selects a preferred RI, PMI by applying a precoding matrix (step S102). That is, the UE can select the preferred RI, PMI by applying various precoding matrices included in a codebook to the estimated channel. The preferred RI, PMI can be selected in reference to a per-node RI and a per-node PMI for each node which transmits a signal to the UE.

In case of applying the precoding matrix based on the selected PMI, the UE measures a quality of layer (QoL) for each layer (step S103). The QoL can be measured in various manners. For example, if $E_i\{\ \}$ denotes a function for outputting an average value for an input i, an average magnitude $E_i\{|x^{(k)}(i)|\}$ or average power $E_i\{|x^{(k)}(i)|^2\}$ of a signal received at an $k^{th}$ layer can be used to measure the QoL.

Among the available CLMs, the UE selects a CLM in which layers having a smallest difference in the QoL are mapped to the same codewords (step S104).

For example, as shown in Table 2 above, if the number of layers is 8 and the number of codewords is 2, the number of available CLMs may be 4 in total. In this case, a CLM having a CLM index 0 maps a first codeword to layers #1 to #3 and maps a second codeword to layers #4 to #7. A CLM having a CLM index 1 maps a first codeword to layers #0 to #2 and maps a second codeword to layers #3 to #7. A CLM having a CLM index 2 maps a first codeword to layers #0 to #1 and maps a second codeword to layers #2 to #7. A CLM having a CLM index 4 maps a first codeword to a layer #0 and maps a second codeword to layers #1 to #7. A CLM which maps layers having a small difference in the QoL to the same codeword is selected among these four CLMs.

For example, as a method of selecting the layers having a small difference in the QoL, it is possible to select a combination of minimizing a dispersion of QoL values of layers mapped to one codeword or a combination of minimizing a value obtained by subtracting a minimum QoL value from a maximum QoL value.

When channel state information is fed back, the UE feeds back a CLM indicator indicating the selected CLM together (step S105). That is, the UE feeds back the CLM indicator together with the RI and the PMI. Then, the BS can determine a CLM to be applied to the UE by using the CLM indicator.

Although an example in which the CLM indicator is used as feedback information of the UE is described in FIG. 4, it does not mean that the CLM indicator is always used only as the feedback information of the UE. That is, the CLM indicator may be transmitted to the UE by being included in control information of the BS. The BS transmits the CLM indicator to the UE in order to decrease a complexity of finding a CLM preferred by the UE. For example, the BS may map a plurality of codewords to one layer, and may map at least one mapped layer to at least one antenna port, so that a signal mapped to the antenna port can be transmitted through at least one node among a plurality of nodes in a multi-node system. In this process, the BS can transmit the CLM indicator. The CLM indicator indicates any one of a plurality of determined codeword-to-layer mappings, and reports the codeword-to-layer mapping used in a process of mapping the plurality of codewords to at least one layer to the UE.

Alternatively, if the BS transmits the CLM indicator to the UE, the UE may not have to find the preferred CLM. For example, two nodes may be allocated to the UE in such a manner that a first node has one antenna port and a second node has four antenna ports. Herein, the BS may transmit two codewords through the two nodes. In this case, only one layer is mapped to the first codeword, and a specific number of layers, i.e., 1 to 4 layers, are allocated to the second codeword. Therefore, as control information, the BS may transmit to the UE a CLM indicator indicating a CLM having a relation in which a first codeword is mapped only to one layer among CLMs (for example, if the number of layers is 4 and the number of codewords is 2 in Table 2 above, the CLM indicator is 1).

If the CLM is defined between the BS and the UE as shown in Table 2, there is only one CLM, in which a first codeword is mapped to only one layer, for each number of layers. Therefore, in this case, the UE does not need to selectively feed back the CLM indicator.

If the BS provides two or more CLM indicators for each number of layers as control information, the UE needs to feed back a preferred CLM among them. However, even in this case, an amount of feedback information is decreased in comparison with a case where the control information is not provided. If the BS transmits, to the UE, candidates of CLMs applicable to the UE by restricting the number of candidates to be less than or equal to a specific number for each number of layers, an amount of feedback information is decreased since the UE selects a preferred CLM among a specific number (or less) of CLM candidates.

For example, in a system to which Table 2 is applied, if the BS always transmits control information regarding CLM candidates by restricting the number of candidates to be less than or equal to 2 for each number of layers, the UE can feed back which CLM is more preferred by using 1-bit information. In this case, the 1-bit information may be fed back in replacement of the CLM indicator.

In addition to the CLM shown in Table 2 above, there may be more CLMs that can be applied for each number of layers. For example, if the number of layers is 4, although only two CLMs are exemplified in Table 2 above, more CLMs may exist. For example, there may be a CLM in which a first codeword is mapped to layers #1 to #3 and a second codeword is mapped to a layer #0. Alternatively, the first codeword may be mapped to the layer #0 and the second codeword may be mapped to the layers #1 and #3. Alternatively, the first codeword may be mapped to the layers #0 and #3 and the second codeword may be mapped to the layers #1 and #2.

As such, various CLMs can be added to Table 2 above. However, if the number of CLMs is increased as such, an amount of information (e.g., the number of bits of the CLM indicator) which must be transmitted by the BS or the UE is also increased, thereby causing a problem in that a signaling overhead is increased and a UE's reception complexity is increased. Therefore, in order to solve this problem, a layer permuter may be included between a layer mapper and a precoder. Of course, a case where a plurality of CLMs are provided for the same layer and codeword is not only one case of using the layer permuter. That is, a method described hereinafter may be used in combination with the aforementioned method or may be used independently.

Figure 5:
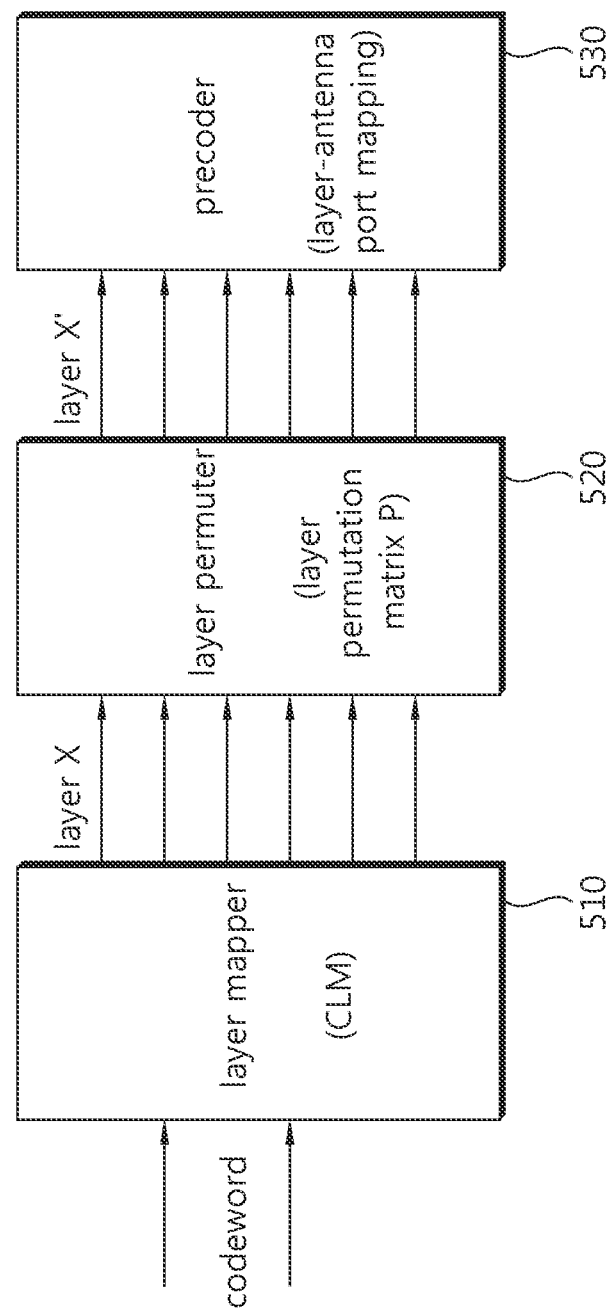
FIG. 5 shows a physical layer signal processing procedure including a layer permutation in a multi-node system.

FIG. 5 shows a physical layer signal processing procedure including a layer permutation in a multi-node system.

Referring to FIG. 5, the multi-node system may include a layer mapper 510, a layer permuter 520, and a precoder 530. FIG. 5 differs from FIG. 2 in that the layer permuter 520 is further included.

The layer permuter 520 is a unit which takes a role of changing a layer order. From an aspect of a signal processing procedure, the layer permuter 520 exists between the layer mapper 510 and the precoder 530. Therefore, the layer permuter 520 can be implemented in a separate unit as shown in FIG. 5, or can be implemented by being included in the layer mapper 510 or the precoder 530.

Assume that K layers are output through the layer mapper 510. In this case, symbols transmitted in a $k^{th}$ layer can be expressed with a $1 \times M^{layer}_{symb}$ vector. Such a vector is denoted by $x^{(k)}$, where k=0, ..., K−1. That is, $x^{(k)}=[x^{(k)}(0), x^{(k)}(1), ..., x^{(k)}(M^{layer}_{symb})]$. If vectors transmitted in all layers are gathered and expressed in a matrix form, it can be expressed by a matrix having a size of $K \times M^{layer}_{symb}$. If such a matrix is denoted by X, it can be expressed by $X=[x^{(0)T} x^{(1)T} x^{(K-1)T}]^T$. Herein, T denotes a transpose.

The layer permuter 520 has an effect of multiplying a K×K layer permutation matrix P by a matrix X. Herein, the layer permutation matrix P has $K^2$ elements. Among the elements, the number of '1's is K and the number of '0's is $K^2-K$. In the matrix P, if an element located at (i, j) is 1, it has a characteristic in which all elements of an $i^{th}$ row excluding that element and all elements of a $j^{th}$ column are 0. That is, in the matrix P, all columns have only one '1', and all rows also have only one '1'. The matrix P has the same characteristic as a transpose matrix. That is, $P^{-1}=P^T$. The layer permuter 520 multiplexes a matrix X which is an output of the layer mapper 510 by the matrix P, and then provides the result to the precoder 530.

If X' denotes a signal input to the precoder 530, X'=PX. According to the characteristic of the matrix P, it can be related as $X=P^{-1}X'=P^TX'$. That is, an input of the precoder 530 with respect to an output of the layer mapper 510 is permuted by the layer permutation matrix P (X'=PX), and on the contrary, an output of the layer mapper 510 with respect to an input of the precoder 530 is permuted by a matrix $P^T$ ($X=P^TX'$).

In theory, the total number of layer permutation matrices P for K layers is K!=K×(K−1)× ..., ×2×1. If K is greater than or equal to 4, the number of layer permutation matrices P becomes significantly great, which may cause a high signaling overhead and UE complexity. Therefore, the number of layer permutation matrices P can be restricted by specifying additional signaling or a specific rule.

In the additional signaling, for example, a selectable layer permutation matrix can be reported by a BS to a UE by using a bitmap. In the specific rule, for example, the layer permutation matrix P is restricted to a node-based permutation matrix. The node-based permutation matrix implies a permutation matrix which maps specific layers to a specific node. The node-based permutation matrix (or node-based permutation) can be applied when the number of layers through which a signal is transmitted for each node can be known between the BS and the UE.

For example, assume that a case where a node 1, a node 2, and a node 3 transmit signals to the UE. In this case, signals can be transmitted through antenna ports #0 and #3 in the node 1, through an antenna port #4 in the node 2, and through an antenna port #5 in the node 3. In addition, assume that four layers are mapped to the node 1, one layer is mapped to each of the nodes 2 and 3, and the UE selects a CLM indicator for {layer number 6, codeword number 2} in Table 2 above. That is, it is assumed that, preferably, a first codeword is mapped to two layers mapped to the node 2 and the node 3, and a second codeword is mapped to four layers mapped to the node 1. In this case, however, since antenna ports #0 to #3 are provided for the node 1, if the CLM of Table 2 above is directly applied, a first codeword is mapped to layers #0 and #1 of the node 1, and a second codeword is mapped to layers #2 and #3. As such, two codewords are transmitted in layers mapped to the node 1, which is against a system performance optimization condition. Therefore, in this case, the BS can apply a layer permutation matrix P of the following table to the layer permuter 520.

TABLE 3

$$P = \begin{bmatrix} 0 & 0 & 1 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \\ 1 & 0 & 0 & 0 & 0 & 0 \\ 0 & 1 & 0 & 0 & 0 & 0 \end{bmatrix}$$

Then, a first codeword is mapped to layers #0 and #1 by a CLM selected from Table 2, and is mapped to layers #4 and #5 by the layer permutation matrix P. Layers #4 and #5 are transmitted through nodes 2 and 3 according to an allocated antenna port number. If a combination of layer permutations is limited only to node-based layer permutation as in the above example, the layer permutation can be performed by using node permutation information.

For convenience, it is assumed hereinafter that three nodes, i.e., the node 1, the node 2, and the node 3, perform transmission of a layer 4, a layer 1, and a layer 1, respectively, to a UE. In addition, it is assumed that the nodes 1, 2, and 3 are sorted according to an antenna port order. That is, it is assumed that the node 1 transmits a signal through antenna ports #0 to #3, the node 2 transmits a signal through an antenna port #4, and the node 3 transmits a signal through an antenna port #5. In addition, it is also assumed a case where two codewords are transmitted.

Figure 6:
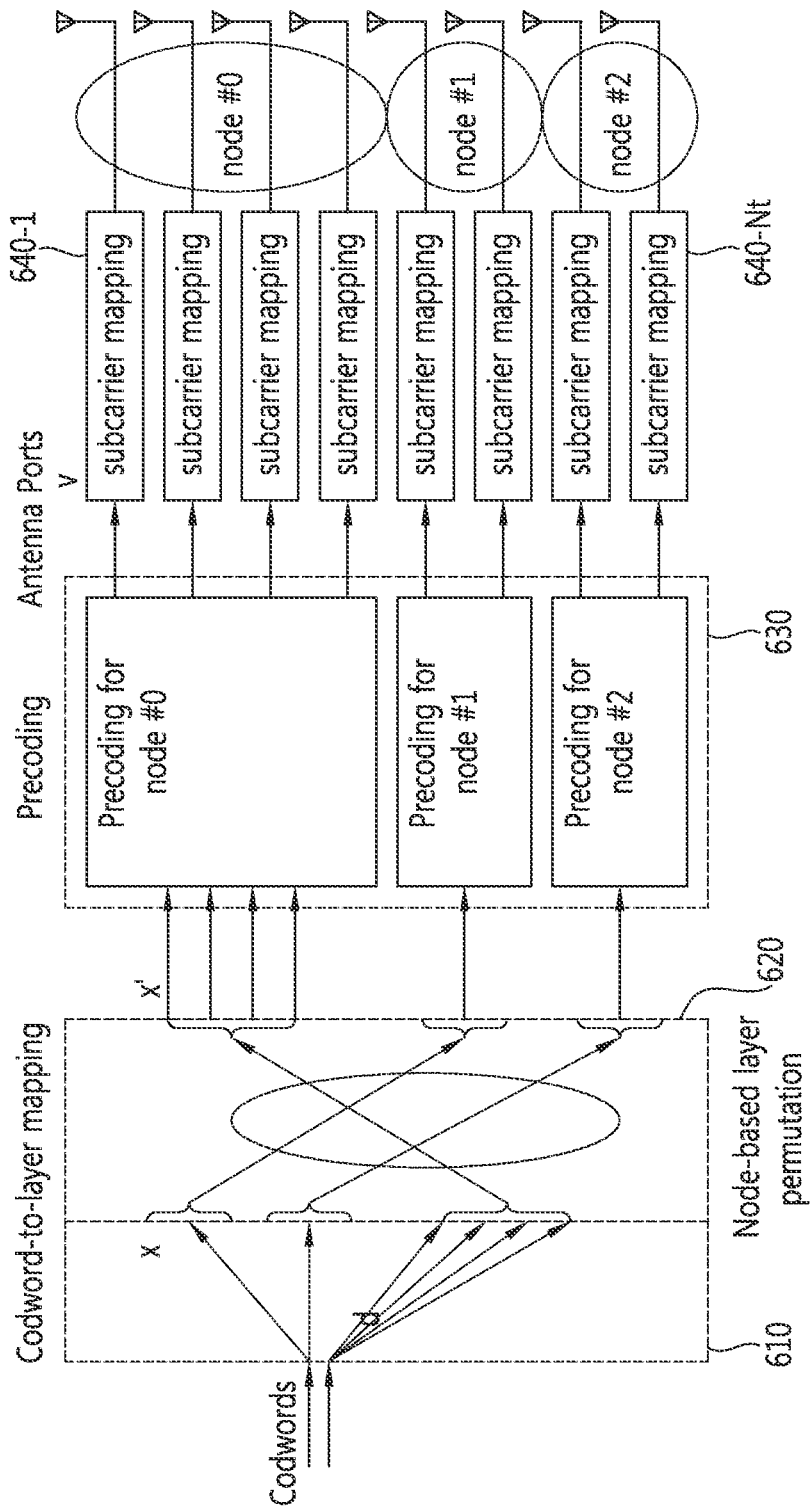
FIG. 6 shows an example of performing a node-based layer permutation according to an embodiment of the present invention.

FIG. 6 shows an example of performing a node-based layer permutation according to an embodiment of the present invention.

Referring to FIG. 6, a multi-node system may further include a layer mapper 610, a layer permuter 620, and a precoder 630.

The layer mapper 610 maps a plurality of codewords to at least one layer. The layer permuter 620 receives a plurality of layers input from the layer mapper 610 so as to group them into layers in the same number as a rank value of at least one node, and permutes the grouped layers. The precoder 630 receives a plurality of layers input from the layer permuter 620, and maps them to an antenna port.

More specifically, in the aforementioned example, the layer mapper 610 may map a first codeword between two codewords to two layers, i.e., layers #0 and #1, and map a second codeword to four layers, i.e., layers #2, #3, #4, #5. That is, in the CLM of {layer number 4, codeword number 2} in Table 2, codeword-to-layer mapping can be performed to a CLM having a CLM indicator of 1.

The layer permuter 620 performs layer permutation by grouping layers in the same number as a per-node rank. That is, a node-based layer permutation or a layer grouping-based layer permutation is performed. In the above example, the layer permuter 620 changes locations of lower four layers, i.e., layers #2, #3, #4, #5, output from the layer mapper 610, so as to be input to upper four layers, i.e., layers #0, #1, #2, #3. In addition, the layer permuter 620 changes locations of upper two layers, i.e., layers #0 and #1, output from the layer mapper 610, so as to input to lower two layers, i.e., layers #4 and #5.

The node-based layer permutation can be seen as mapping which changes a node order (0, 1, 2) of an output port of the layer mapper 610 to a node order (1, 2, 0) of an input port of the layer permuter 620. On the contrary, it can also be seen that a node order (0, 1, 2) of the input port of the layer permuter 620 is mapped to a node order (2, 0, 1) of the output port of the layer mapper 610.

The reason of performing the node-based layer permutation is to restrict the number of layer permutations in order to decrease a signaling overhead and decrease a complexity of finding optimal layer permutation by a UE. That is, if layer permutation is performed without any restriction, the total number of layer permutations that can be performed by K layers is K!, whereas the total number of layer permutations for M (<K) nodes is M!. Therefore, a signaling overhead and a UE complexity are decreased.

Assume that M nodes (i.e., node 0, node 1, . . . , node M−1) sorted according to an antenna port number respectively have rank values $r(0)$, $r(1)$, $r(M-1)$ in general.

In this case, a node-based layer permutation rule for the M nodes can be given as follows. Layer mapper output port's nodes {0, 1, . . . , M−1}→Precoder input port's nodes {p(0), p(1), p(M−1)}. Herein, p(i) is an integer greater than or equal to 0 and less than or equal to M−1, and when i and j are different from each other, $p(i) \neq p(j)$. In this case, the precoder input port and the layer mapper output port can be specified by a layer permutation matrix $P^T$. That is, the node-based layer permutation is specified by a layer permutation matrix P.

Figure 7:
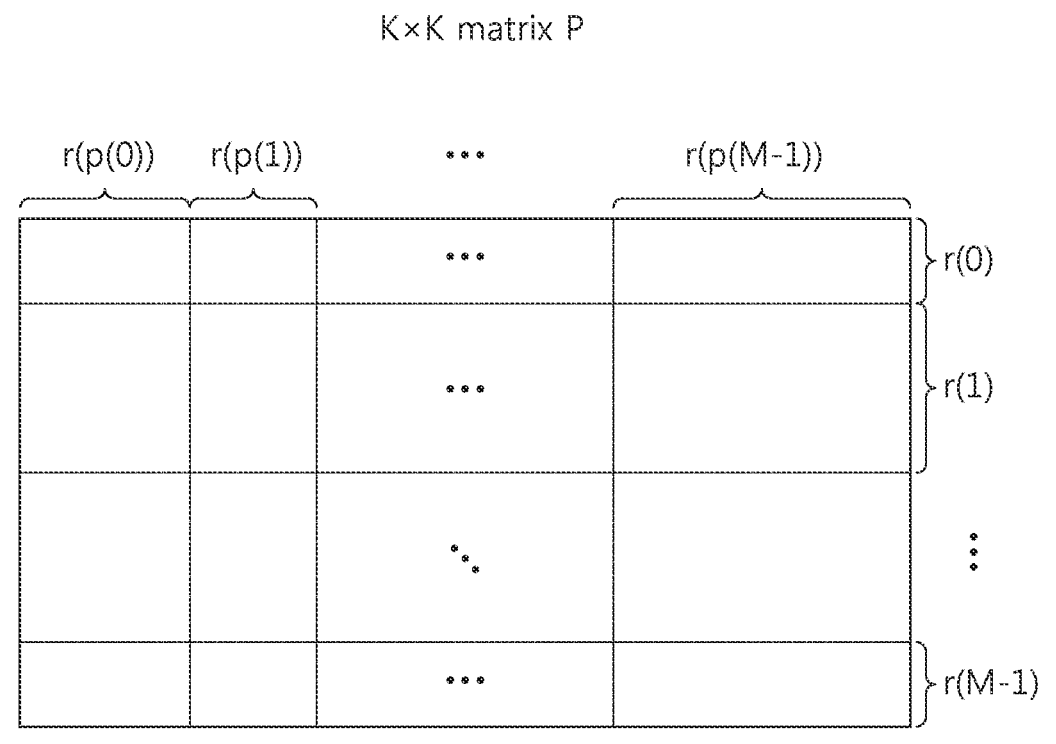

FIG. 7 shows an example of obtaining a layer permutation matrix P for a node-based layer permutation.

Referring to FIG. 7, the layer permutation matrix P has a size of K×K. Herein, K denotes a total rank value of all nodes which communicate with a UE. In the K×K matrix, while incrementing i (i=0, 1, . . . , M−1) by one from 0, rows are sequentially grouped in a unit of r(i) and are then divided into a row group. Each of the divided row groups is called a row block, and an $i^{th}$ row block is indicated by a row block #i. Next, according to a node-based layer permutation rule, while incrementing i by 1 from 0, columns are sequentially grouped in a unit of r(p(i)) and are then divided into a column group. The divided column group is called a column block, and an $i^{th}$ column block is indicated by a column block #i. Next, while incrementing i by 1 from 0, a unitary matrix having a size of r(i)×r(i) is inserted to a cross block in which a row block #i and a column block #$p^{-1}(i)$ are crossed, and all elements which are crossed with the remaining column blocks in the row block #i are filled with 0. Herein, $p^{-1}(i)$ denotes a value j when p(j)=i.

If it is given an relation of: precoder input port's nodes {0, 1, . . . , M−1}→layer mapper output port's nodes {q(0), q(1), . . . , q(M−1)}, the aforementioned method can be applied by first obtaining a relation opposite to the above relation, that is, layer mapper output port's nodes {0, 1, . . . , M−1}→precoder input port's nodes {p(0), p(1), . . . , p(M−1)}. Alternatively, $q^{-1}(i)$ can be applied instead of p(i), and q(i) can be applied instead of $p^{-1}(i)$ directly in the aforementioned method.

FIG. 8 shows an example of obtaining a layer permutation matrix P by applying the method described in FIG. 7 to the example described in FIG. 6.

A layer permuter 620 must apply a layer permutation matrix P which satisfies a relation of: layer mapper output port's nodes {0, 1, 2}→precoder input port's nodes {1, 2, 0}. For this, in a 6×6 matrix, a row block is generated by grouping rows by r(0)=4, r(1)=1, r(2)=1. In addition, a column block is generated by grouping columns by r(p(0))=1, r(p(1))=1, r(p(2))=4. A unitary matrix is inserted to a 4×4 block in which a row block is crossed with a column block #2 corresponding to j=2 when p(j)=0. Likewise, a unitary matrix (herein, 1) is inserted to a 1×1 block in which a row block #1 is crossed with a column block #0 corresponding to $p^{-1}(1)$=0, and a unitary matrix (herein, 1) is inserted to a 1×1 block in which a row block #2 is crossed with a column block #1 corresponding to $p^{-1}(2)$=1. Then, the remaining blocks are all filled with 0. It can be seen that the layer permutation matrix P obtained through this process is the same as Table 3 above.

Hereinafter, a method of operating a UE for supporting a case where a layer permuter performs a node-based layer permutation (or layer grouping-based layer permutation) will be described.

Figure 9:
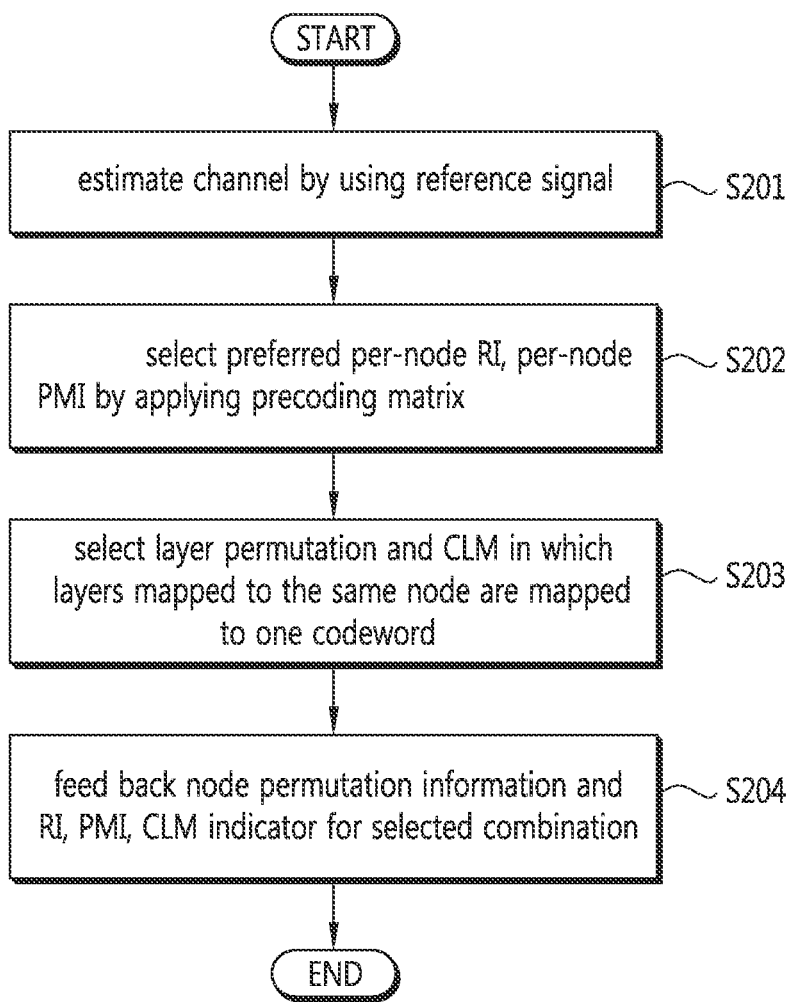
FIG. 9 is a flowchart showing a method of operating a user equipment which performs a node-based layer permutation.

FIG. 9 is a flowchart showing a method of operating a UE which performs a node-based layer permutation.

Referring to FIG. 9, the UE receives a reference signal to estimate a channel (step S201). The reference signal may be CSI-RS, CRS, etc.

The UE selects a preferred per-node rank (RI) and per-node PMI by applying/comparing various precoding matrices to the estimated channel (step S202).

The UE selects a layer permutation and a CLM in which layers mapped to the same node are mapped to one codeword (step S203). According to the number of layers and the number of codewords, one CLM may be given or a plurality of CLMs may be given. If it is assumed that the plurality of CLMs are given, the UE can select one CLM among the plurality of CLMs. The UE applies various node-based layer permutations depending on the selected per-node rank by combining with the plurality of CLMs. As a result, the node-based layer permutation and the CLM in which layers mapped to the same node are mapped to one codeword are selected. If the CLM and the node-based permutation combination are plural in number, the UE can select a combination by which layers having a small difference in a quality of layer are mapped to the same codeword.

The UE feeds back an RI, PMI, CLM indicator for the selected CLM and node-based layer permutation combination, and node permutation information to the BS (step S204).

Herein, the node permutation information is information for reporting the node-based layer permutation (i.e., a node-based layer permutation matrix). The node permutation information can be signaled in various manners. For example, if it is selected a relation of: layer mapper output port's nodes {0, 1, . . . , M−1}→precoder input port's nodes {p(0), p(1), p(M−1)}, p(0), p(1), p(M−1) can be reported by sequentially expressing in a bit. Alternatively, a mapping relation between the layer mapper output port and the precoder input port can be reported in a form of M×M matrix. If the M×M matrix is denoted by $P_{node}$, an index of $P_{node}$ can be signaled.

Alternatively, a bitmap can be configured to report the precoder input port's nodes to which the layer mapper output port's nodes are mapped. For example, if a specific node of the layer mapper output port is mapped to a second node of the precoder input port, a bitmap is transmitted as '0100'. Alternatively, the layer mapper output port's nodes to which the precoder input port's nodes are mapped can be signaled.

Node permutation information can be fed back with a longer period than that of the RI, PMI, CQI, per-node rank, and CLM indicator. This is because a period for changing a mapping relation of a codeword with respect to nodes may be significantly longer than a period for changing a rank. The rank may change rapidly along with an instantaneous channel state change. However, the change in the rank does not necessarily mean that the mapping relation of the codeword with respect to the node is also changed.

It is assumed that three nodes, i.e., the node 1, the node 2, and the node 3, perform transmission of a layer 4, a layer 1, and a layer 1, respectively, to a UE. In addition, it is assumed that the nodes 1, 2, and 3 are sorted according to an antenna port order. That is, it is assumed that the node 1 transmits a signal through antenna ports #0 to #3, the node 2 transmits a signal through an antenna port #4, and the node 3 transmits a signal through an antenna port #5. In this case, if a rank of the node 1 changes from 4 and 3 and a full rank changes from 6 and 5, since the full rank and a per-node rank value change, the CLM indicator must also change to indicate a CLM for a layer combination {2,3} from a layer combination {2,4}. However, there is no need to change the node permutation information, that is, information indicating the relation of: layer mapper output port's nodes {0,1,2}→precoder input port's nodes {1,2,0}. Therefore, even if the node permutation information is fed back with a longer period than that of channel state information and CLM indicator, it has not much effect on system performance. For example, the node permutation information may be fed back by the UE only at a time when the BS allocates a node to the UE. In addition, the CQI, PMI, RI, per-node rank, CLM indicator may be partially or entirely fed back at a time when scheduling is performed in an allocated node.

A case where the UE feeds back node permutation information to the BS is not only one case of using the node permutation information. That is, it is also possible to transmit the node permutation information by the BS to the UE as control information. By using the node permutation information, the BS can report to the UE that a specific node-based layer permutation is applied. For example, assume that a node #0 transmits upper four CSI-RS antenna ports, and a node #1 transmits lower two CSI-RS antenna ports. If it is determined that the UE surely receives more layers transmitted from the node #0, the node-based layer permutation can be changed to, for example, layer mapper output port's nodes {0,1}→precoder input port's nodes {1,0}, and thereafter the CLM of Table 2 can be applied. This is because a smaller number of layers are mapped to a higher codeword in Table 2. In this case, the BS can transmit node permutation information to the UE as control information, so that channel state information, a per-node rank, and a CLM indicator are fed back to the UE under a given node-based layer permutation.

It is also possible that the node permutation information indicates two or more node-based layer permutations. In this case, the UE can feed back which permutation is preferred among a plurality of node-based layer permutations indicated by the node permutation information received as control information.

Comparing the node permutation information with the layer permutation information, since a rank of the UE can be instantaneously changed in the layer permutation information, it is necessary to feed back the layer permutation information for various per-node rank combinations. However, since the node permutation information is irrelevant to a per-node rank, an amount of control information is significantly decreased. In addition, since the node based layer permutation is less influenced by an instantaneous channel change, the node permutation information can be less frequently transmitted.

Although the aforementioned exemplary system has been described on the basis of a flowchart in which steps or blocks are listed in sequence, the steps of the present invention are not limited to a certain order. Therefore, a certain step may be performed in a different step or in a different order or concurrently with respect to that described above. Further, it will be understood by those ordinary skilled in the art that the steps of the flowcharts are not exclusive. Rather, another step may be included therein or one or more steps may be deleted within the scope of the present invention.

The aforementioned embodiments include various exemplary aspects. Although all possible combinations for representing the various aspects cannot be described, it will be understood by those skilled in the art that other combinations are also possible. Therefore, all replacements, modifications and changes should fall within the spirit and scope of the claims of the present invention.

What is claimed is:

1. A signal transmission method of a user equipment (UE) in a multi-node system including a plurality of nodes and a base station (BS) coupled to each of the plurality of nodes and capable of controlling each node, the method comprising:
estimating a channel for at least one node by receiving a reference signal from the at least one node among the plurality of nodes;
selecting a preferred rank and precoding matrix index by applying at least one precoding matrix to the estimated channel;
selecting one of a plurality of codeword-to-layer mappings (CLMs) by applying a precoding matrix indicated by the rank and the precoding matrix index; and
transmitting the selected rank, the selected precoding matrix index, and a codeword-to-layer mapping (CLM) indicator to the BS,
wherein the plurality of CLMs are determined regarding a total number of layers of the at least one node and a number of codewords transmitted in the at least one node, and the CLM indicator indicates the CLM selected from the plurality of CLMs.

2. The method of claim 1, further comprising:
receiving from the BS a plurality of codewords mapped to a plurality of layers; and
measuring quality for each of the plurality of layers,
wherein the CLM indicator indicates a CLM in which layers having a smallest difference in quality among the plurality of layers are mapped to a same codeword.

3. The method of claim 2, wherein the plurality of codewords are two codewords.

4. The method of claim 2, wherein a maximum number of the plurality of layers is 8.

5. The method of claim 2, wherein quality of each of the plurality of layers is determined based on an average magnitude or average power of signals received through the respective layers.

6. The method of claim 2, wherein the layers having the smallest difference in quality among the plurality of layers are layers which minimize a dispersion of quality values of layers mapped to one codeword or layers which minimize a value obtained by subtracting a minimum quality value from a maximum quality value of each layer.

7. The method of claim 1, wherein the preferred rank and precoding matrix index are selected from a per-node rank and per-node precoding matrix index for each of the at least one node.

8. The method of claim 7, further comprising transmitting layer permutation information to the BS, wherein the layer permutation information is information indicating a layer permutation performed after the CLM selected from the plurality of CLMs.

9. The method of claim 8, wherein the layer permutation is a permutation performed after grouping layers output by using a CLM indicated by the CLM indicator.

10. The method of claim 9, wherein grouping of the output layers is determined according to a rank value of each node included in the at least one node.

11. The method of claim 8, wherein the layer permutation is for mapping layers mapped to a same node to one codeword among layers output by using the CLM indicated by the CLM indicator.

12. The method of claim 8, wherein the node permutation information is transmitted to the BS with a period longer than the selected rank and the selected precoding matrix index.

13. A signal transmission method of a user equipment (UE) in a multi-node system including a plurality of nodes and a base station (BS) coupled to each of the plurality of nodes and capable of controlling each node, the method comprising:
estimating a channel for at least one node by receiving a reference signal from the at least one node among the plurality of nodes;
selecting a preferred per-node rank and per-node precoding matrix index for each of the at least one node by applying at least one precoding matrix to the estimated channel;
selecting a layer permutation by applying a precoding matrix indicated by the per-node rank and the per-node precoding matrix index; and
transmitting to the BS the per-node precoding matrix, the layer permutation, and a layer permutation indicator indicating the per-node rank.

14. The method of claim 13, wherein the layer permutation is a permutation performed after grouping layers input to a precoding matrix indicated by the precoding matrix index according to a rank value of the at least one node.

15. A signal transmission method in a base station (BS) coupled to each of a plurality of nodes and capable of controlling each node, the method comprising:
transmitting a codeword-to-layer mapping (CLM) indicator;
mapping a plurality of codewords to at least one layer;
mapping the mapped at least one layer to at least one antenna port; and
transmitting a signal mapped to the antenna port through at least one node among the plurality of nodes,
wherein the CLM indicator indicates at least one of a plurality of CLMs,
wherein the CLMs are determined regarding a total number of layers of the at least one node and a number of codewords transmitted in the at least one node, and
wherein a CLM used in the mapping of the plurality of codewords to at least one layer is limited by the CLM indicator.

16. The method of claim 15, the method further comprising:
transmitting information indicating a preferred CLM among the plurality of CLMs to the BS by a user equipment (UE) which receives the CLM indicator.

17. A signal transmission apparatus comprising:
a layer mapper for mapping a plurality of codewords to at least one layer;
a layer permuter for receiving a plurality of layers input from the layer mapper, for grouping layers in a same number as a rank value of at least one node, and for permuting the grouped layers; and
a precoder for receiving a plurality of layers input from the layer permuter and for mapping the layers to an antenna port, wherein the layer mapper selects one of a plurality of codeword-to-layer mappings (CLMs), and wherein the CLMs are determined regarding a total number of layers of the at least one node and a number of codewords transmitted in the at least one node, and wherein the layer permuter groups the plurality of layers input from the layer permuter into layers in the same number as the rank value of the at least one node and thereafter permutes the grouped layers.

* * * * *